United States Patent

[11] 3,550,881

| [72] | Inventor | Robert J. Roman |
| | | Rochester, N.Y. |
| [21] | Appl. No. | 776,083 |
| [22] | Filed | Nov. 15, 1968 |
| [45] | Patented | Dec. 29, 1970 |
| [73] | Assignee | Eastman Kodak Company |
| | | Rochester, N.Y. |
| | | a corporation of New Jersey |

[54] MANUALLY OPERATED FILM STRIPPER MECHANISM
8 Claims, 7 Drawing Figs.

[52] U.S. Cl.................................................. 242/192, 352/157
[51] Int. Cl................................................... G03b 1/04, G11b 15/32
[50] Field of Search.................................... 242/192, 208; 352/157, 158

[56] References Cited

UNITED STATES PATENTS

| 2,359,612 | 10/1944 | Bolsey........................ | 242/197X |
| 3,429,518 | 2/1969 | McKee........................ | 242/192X |

FOREIGN PATENTS

| 448,724 | 4/1968 | Switzerland................. | 242/197 |

*Primary Examiner*—Leonard D. Christian
*Attorneys*—Robert W. Hampton and G. Herman Childress ABSTRACT: In a simplified film-stripper mechanism of the type including a drive member and a stripper finger movable into peripheral contact with a roll of film or other strip material to separate the leading end thereof from the roll and to feed it into a threading channel of a motion picture projector or similar apparatus, all of the motive power required to operate the stripping mechanism is derived from manual actuation of an operating member.

PATENTED DEC 29 1970    3,550,881
SHEET 1 OF 2
FIG. 1
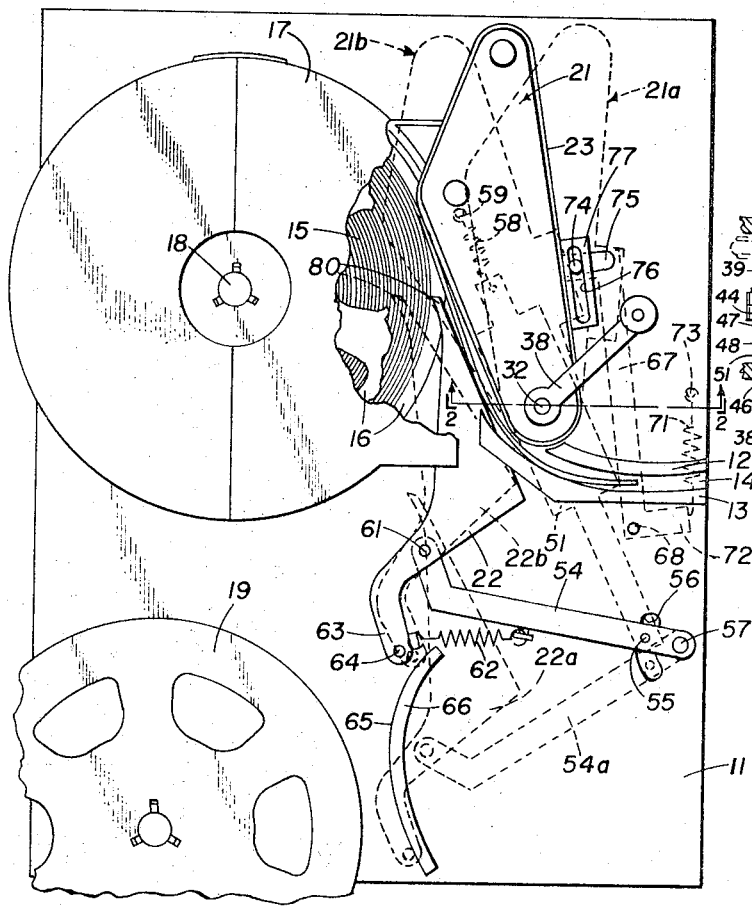
FIG. 2
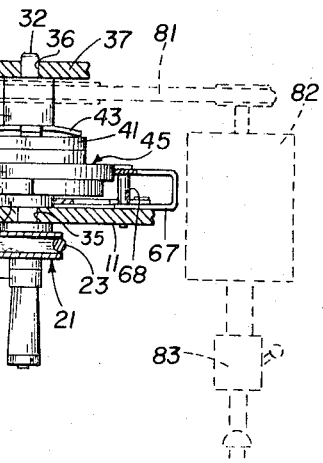
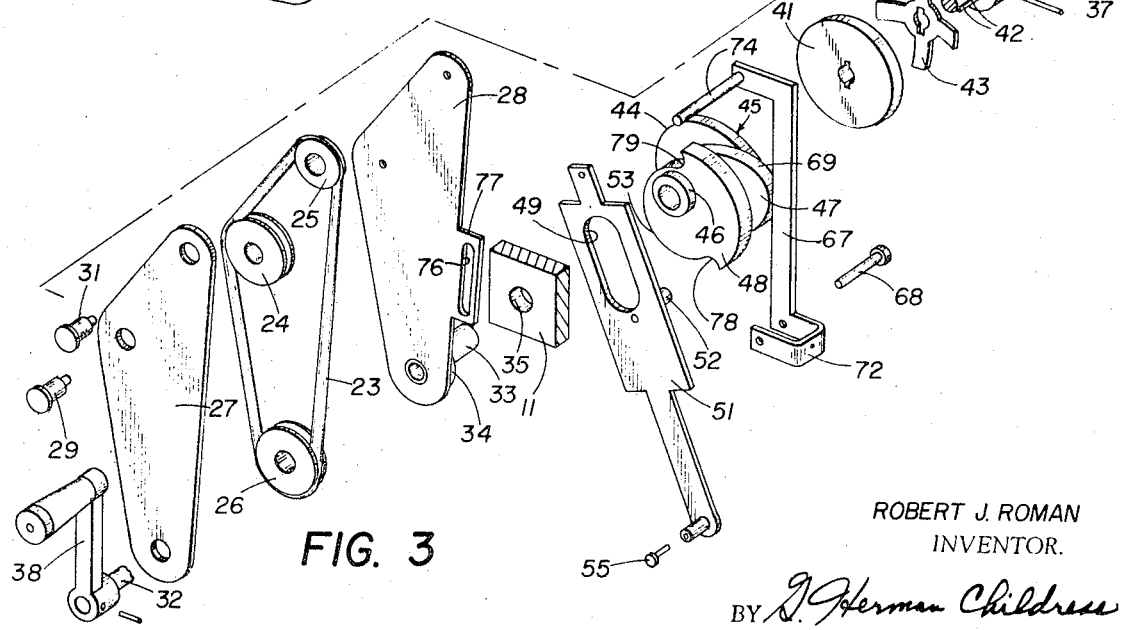
FIG. 3
ROBERT J. ROMAN
INVENTOR.
BY J. Herman Childress
Robert W. Hampton
ATTORNEYS

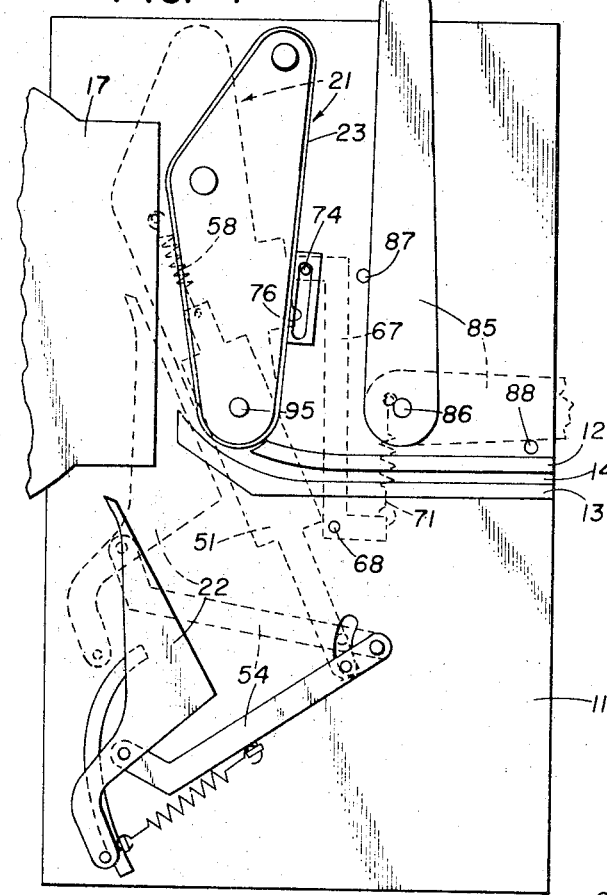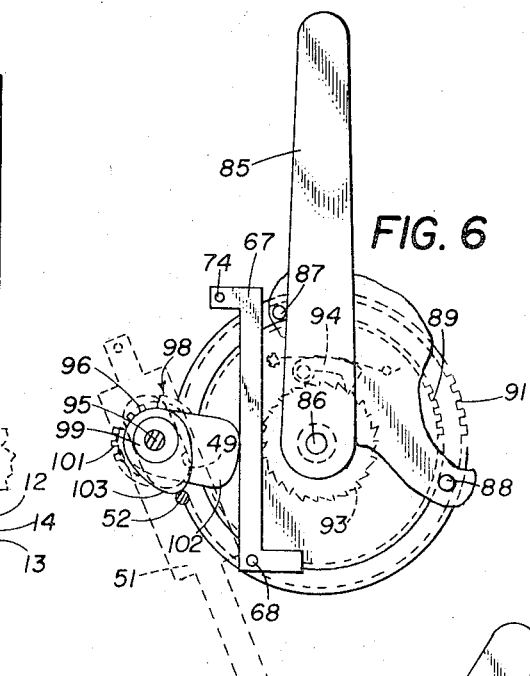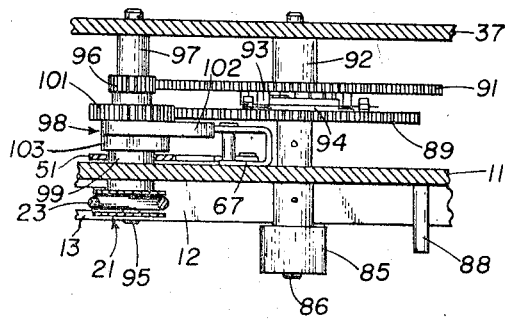

MANUALLY OPERATED FILM STRIPPER MECHANISM

REFERENCE TO RELATED APPLICATIONS

Reference is hereby made to commonly assigned application Ser. No. 470,499 entitled "Automatic Film Stripper," filed in the name of Edward S. McKee on Jul. 8, 1965, commonly assigned application Ser. No. 643,503 entitled "Cartridge for Reel of Strip Material," filed in the names of John J. Bundschuh, and Kenneth W. Thompson on Jun. 5, 1967, commonly assigned application Ser. No. 643,502 entitled "Cinematographic Cartridge Projector Apparatus," filed in the names of John J. Bundschuh, Robert J. Roman and Kenneth W. Thompson on Jun. 5, 1967, commonly assigned application Ser. No. 685,616 entitled "Cinematographic Projectors or the Like and Cartridges for Use Therewith," filed in the names of John J. Bundschuh and Robert J. Roman on Nov. 24, 1967, and commonly assigned application Ser. No. 772,165 entitled "Self-Threading Motion Picture Projector or the Like," filed in the name of Robert J. Roman on Oct. 31, 1968.

BACKGROUND OF THE INVENTION

1. Field of the Invention

The present invention relates principally to motion picture projectors or related devices such as tape recorders and more specifically to a simplified manually operated stripper mechanism including a drive member and a stripper finger movable into peripheral contact with a roll of film or other strip material to separate the leading end of the film from the roll and to feed it along a predetermined threading path to effect automatic threading of the machine.

2. Description of the Prior Art

The basic type of stripper mechanism to which the present invention relates is the subject of commonly assigned application Ser. No. 470,499 entitled "Automatic Film Stripper," filed in the name of Edward S. McKee on Jul. 8, 1965 and is further disclosed in conjunction with a film magazine particularly adapted for use therewith in commonly assigned application Ser. No. 643,503, entitled "Cartridge for Reel of Strip Material," filed in the names of John J. Bundschuh and Kenneth W. Thompson on Jun. 5, 1967. This type of stripper mechanism includes a drive member comprising a longitudinally traveling endless belt or other drive means which is movable into peripheral contact with a roll of film or other strip material wound onto a rotatably supported supply reel, to thereby impart unwinding rotation to that roll. Additionally, a stripper finger is movable into simultaneous engagement with the periphery of the roll to separate the leading end of the strip material therefrom and to guide it along a predetermined threading path established in part between the stripper finger and the drive member.

Motion picture projectors and related devices incorporating various embodiments of the above-described stripper mechanism and different means for automatically effecting properly timed coordination of the movements of the drive member and stripper finger by power operated means are disclosed in commonly assigned application Ser. No. 643,502, entitled "Cinematographic Cartridge Projector Apparatus," filed in the names of John J. Bundschuh, Robert J. Roman and Kenneth W. Thompson on Jun. 5, 1967 and in commonly assigned application Ser. No. 685,616 entitled "Cinematographic Projectors or the Like and Cartridges for Use Therewith," filed in the names of John J. Bundschuh and Robert J. Roman on Nov. 24, 1967. Another embodiment of the same type of film stripper mechanism is disclosed in commonly assigned application Ser. No. 772,165 entitled "Self-Threading Motion Picture Projector or the Like," filed in the name of Robert J. Roman on Oct. 31, 1968 which is directed to a simplified manually operated control system for effecting the movements of the stripper finger and drive member into and out of engagement with the roll in proper coordination with the operation of other elements of the projector or related machine. In all of these various embodiments, however, the drive belt or other means which engages and imparts rotation to the roll is driven continuously by power operated means, even when it is performing no useful function. Although this continuous movement of the stripper belt generally is not sufficiently disadvantageous to warrant the use of a clutch to disengage it when it is not actually performing its stripping function, the fact that the stripper belt is power driven requires that the motor of the machine be sufficiently powerful to operate the stripper belt in addition to its other functions. Furthermore, the necessity for delivering power from the projector motor to the belt member requires the employment of one or more additional power transmission belts or the like, which may have to be directed along indirect paths by pulleys or similar means; particularly if such a stripper mechanism is incorporated in a projector or related machine of preexisting design. In any event, these power-driven mechanisms increase the cost of projectors.

SUMMARY OF THE INVENTION

To avoid the complications and costs inherent in the above-described power-operated stripper mechanism, the present invention provides a similar stripper mechanism in which both the movement of the stripper finger and the drive member into and out of engagement with the roll and also the roll driving movement of the stripper belt or a roller are derived from manual movement of an operating member incorporated in the stripper-mechanism assembly. Accordingly, the stripper mechanism is, in effect, an independent assembly, which can be incorporated into a projector or the like without regard to the accessibility of its drive motor and without imposing additional power requirements thereon.

Various means for practicing the invention and other advantages and features thereof will be apparent from the following detailed description of illustrative preferred embodiments thereof, reference being made to the accompanying drawings in which like reference numerals refer to like elements.

BRIEF DESCRIPTION OF THE DRAWINGS

In the drawings:

FIG. 1 is a somewhat schematic elevational view of a portion of a cartridge loaded motion picture projector embodying a manually operated film stripper mechanism in accordance with a preferred embodiment of the present invention;

FIG. 2 is a partial section taken generally along line 2–2 in FIG. 1 showing the stripper mechanism;

FIG. 3 is an exploded perspective view of the structure depicted in FIG. 2;

FIG. 4 is a schematic elevational view of another preferred embodiment of the invention in which the stripper mechanism is operated by manual reciprocative movement of an operating lever;

FIG. 5 is a partial section, similar to FIG. 2, illustrating the construction of the stripper mechanism depicted in FIG. 4;

FIG. 6 is a somewhat schematic elevational view illustrating the positions of various components of the stripper mechanism shown in FIGS. 4 and 5 when that mechanism is in its inoperative condition; and FIG. 7 corresponds to FIG. 6 and shows the positions of the depicted components during the operation of the stripper mechanism.

DESCRIPTION OF THE ILLUSTRATIVE PREFERRED EMBODIMENT

The projector partially illustrated in FIGS. 1 through 3 is basically the same as the one described more specifically in the above-identified application Ser. No. 772,165 to which reference may be had for further details thereof. Briefly, this projector comprises a vertical frame plate 11 including film guide members 12 and 13, which define a film guide channel 14 leading into a conventional film gate, not shown, provided with a film pull down mechanism. As described further in the aforementioned applications Ser. Nos. 643,503 and 772,165 the projector is adapted to be loaded with a roll of film 15 wound onto a film supply reel 16, which is housed within a film cartridge 17 removably attached to the frame plate and supported for rotation by a rotatable spindle 18.

When the film cartridge initially is mounted on the projector, the leading end of the film must be separated from the film roll and fed along guide channel 14 into the film gate in order that it will be engaged by the film pull down mechanism, which thereafter feeds it automatically into engagement with the hub of takeup reel 19. To perform this operation, the subject stripper mechanism comprises a stripper belt member 21 and a stripper finger 22 which perform in the same general manner described in the previously identified U.S. Pat. applications but which are operated manually rather than by power-driven means.

As shown in greatest detail in FIG. 3, stripper belt member 21 includes an endless elastic belt 23 of circular cross section encircling idler pulleys 24 and 25 and drive pulley 26, which are supported in coplanar relation to one another between side plates 27 and 28. Idler pulleys 24 and 25 are freely rotatable about their respective pivot studs 29 and 31, which serve to hold the side plates in parallel relation to each other at opposite sides of the pulleys. Drive pulley 26, however, is attached positively to drive shaft 32 rotatably received within support tube 33 extending rearwardly from side plate 28 beyond spacer collar 34. The support tube and the rearward end of the drive shaft are journaled respectively in bearing holes 35 and 36 in the vertical frame plate and a similar vertical support plate 37 located rearwardly thereof. Accordingly, the drive member can be pivoted about the axis of the drive shaft, as shown at 21 a and 21 b in FIG. 1, independently of rotation of the drive shaft.

An operating crank 38 is pinned to the front end of shaft 32 to enable that shaft to be rotated manually in either direction. At the rear end of shaft 32, a collar 39 is also pinned thereto behind a clutch disc 41 which is slidable on the shaft but prevented from rotating relative thereto by splines 42. A cross shaped spring 43 between collar 39 and clutch disc 41 urges the latter forwardly so that its forward face frictionally engages the rearward face of a similar clutch disc 44 of cam member 45. This cam member is rotatably carried by support tube 33 with spacer collar 46 in abutment with the adjacent rearwardly facing surface of frame plate 11. Hence, manual rotation of drive shaft 32 imparts corresponding rotation to the cam member through the limited torque clutch comprising frictionally engaged discs 41 and 44.

Forwardly of clutch disc 44, the cam member includes a drive member cam lobe 47 and a trigger finger cam lobe 48. Between the latter cam lobe and frame plate 11, spacer collar 46 is received in an elongate opening 49 in a slidable cam follower member 51, which is provided with a cam follower pin 52 engageable with edge surface 53 of cam lobe 48. At its lower end, cam follower member 51 is pivotally attached to stripper finger control arm 54 by stud 55 which extends through slot 56 in frame plate 11 adjacent the end of arm 54 pivotally mounted to the frame plate by stud 57. A coil spring 58 is tensioned between the upper end of cam follower member 51 and a stationary pin 59 on the frame plate, thereby urging the cam follower pin 52 upwardly against cam surface 53. Stripper finger 22 is pivotally attached to the free end of arm 54 by a pivot stud 61 and is biased in a counterclockwise direction relative to that arm by a spring 62 tensioned between the arm and the downwardly projecting leg of the stripper finger shown at 63. Also attached to leg 63 of the stripper finger is a cam follower pin 64 which is engageable with a fixed cam surface 65 defined by a raised boss 66 on the frame plate to define the angular relation between the stripper finger and arm 54.

A pivotal cam follower arm 67 is attached to the frame plate by a pivot pin 68 and bears laterally against the peripheral surface 69 or drive member cam lobe 47 under the influence of coil spring 71 stretched between the horizontal lower end portion 72 of arm 67 and a stationary pin 73. At its upper end, arm 67 is provided with an elongate pin 74 which extends through arcuate slot 75 in the frame plate and into vertical slot 76 in ear 77 of side plate 28 to establish the angular position of the stripper belt member.

When crank 38 is rotated manually in a clockwise direction, the cam member rotates in the same direction until it reaches the position shown in FIG. 3 in which abutment surface 78 of cam lobe 48 is in contact with follower pin 52, whereupon clutch disc 41 slips relative to the cam member if the crank continues to be rotated. Accordingly, surface 69 of cam lobe 47 locates cam follower arm 67 substantially vertically, as shown in FIG. 3, and thereby maintains the stripper belt member beyond the film cartridge in the position depicted at 21 a in FIG. 1. Concurrently, surface 53 of cam lobe 48 holds cam follower member 51 in its lowermost position also shown in FIG. 3 and thus locates the stripper finger beyond the film cartridge as illustrated at 22 a in FIG. 1.

After a cartridge has been installed on the projector, while the drive belt member and the stripper finger are in their inoperative positions just described, the operator manually rotates crank 38 in a counterclockwise direction. This causes the cam member to rotate in the same direction to a position in which abutment surface 79 is in contact with follower pin 52. During such rotation of the cam member, the profile of cam surface 53 allows the stripper finger to move upwardly into engagement with the outermost film convolution on the film roll, as shown in solid lines in FIG. 1. Similarly, surface 69 of cam lobe 47 moves out of contact with cam follower arm 67 so that the belt 23 of drive belt member 21 is held in lateral contact with the outermost film convolution by spring 71. As the operator continues to rotate crank 38 in a counterclockwise direction, pulley 26 drives belt 23 in the same direction as the latter continues to engage the film roll. Consequently, the film roll and its reel are driven in an unwinding direction on rotatable spindle 18 due to the peripheral movement of belt 23 in contact with the roll. Preferably, the profiles of cam lobes 47 and 48 are such that the stripper finger engages the film roll before the drive belt does, to insure that the stripper finger is in its operative position before the roll begins to rotate. During such rotation of the film roll, the leading end of the film encounters the tooth portion 80 of the stripper finger and is thereby directed between the stripper finger and the adjacent portion of belt 23 into and along channel 14. The subject stripping mechanism also is adapted to perform in the same manner if a smaller roll of film is wound onto reel 16, in which case the drive member and the stripper finger simply move further into the cartridge as shown respectively at 21 b and 22 b in FIG. 1.

When the continued counterclockwise rotation of crank 38 has effected movement of the leading end of the film into engagement with the film pull down mechanism, the operator simply rotates crank 38 again in a clockwise direction, through somewhat more than a half revolution, to return the drive member and the stripper finger to their former inoperative positions, where they remain until the next threading operation is performed.

Although the above-described mechanism is particularly adapted for manual operation, it could be power operated if desired. For example, as shown in broken lines in FIG. 2, drive shaft 32 could be connected by belt 81 to a reversible electric motor 82 controlled by reversing switch 83, in which case crank 38 would be eliminated.

The embodiment of the invention depicted in FIGS. 4—7 is basically similar to the embodiment just described and incorporates a number of substantially identical components identified by the same reference numerals used in FIGS. 1—3. In this embodiment, however, the stripper mechanism is powered manually by means of an angularly reciprocative operating lever 85 which replaces crank 38.

As illustrated most clearly in FIGS. 4 and 5, operating lever 85 is pinned or otherwise attached to the forward end of countershaft 86 pivotally supported between appropriate bushing holes in frame plate 11 and support plate 37 and is movable arcuately between the positions established by stationary abutment pins 87 and 88. Behind the frame plate, a cam drive spur gear 89 is attached positively to the countershaft and is thus reciprocatively rotatable through an angle of approximately 90°. A somewhat larger belt drive gear 91 provided with a hub 92 is rotatably supported on the countershaft rearwardly of gear 89. A ratchet wheel 93 on the front face of gear 91 is located adjacent the rear face of gear 89 and is engaged by a spring loaded pawl 94 carried by the latter gear. By this means, clockwise rotation of lever 85 imparts corresponding simultaneous rotation to both gears 89 and 91, whenever counterclockwise movement of lever 85 causes gear 89 to rotate in the same direction but allows gear 91 to remain stationary as the pawl overrides the teeth of the ratchet wheel.

Drive shaft 95, which supports and drives the drive belt member, is substantially similar to drive shaft 32 but terminates immediately beyond the drive belt member due to the absence of crank 38. A relatively small pinion 96 is splined or similarly secured to the drive shaft with its hub 97 adjacent vertical support plate 37 and is in constant meshing engagement with belt drive gear 91. Therefore, whenever lever 85 is moved in a clockwise direction, drive pulley 26 and drive belt 23 are thereby driven in a counterclockwise direction. Due to the gear ratio between belt drive gear 91 and pinion 96, the clockwise movement of lever 85 through the approximately 90° angle defined between pins 87 and 88 produces at least one and preferably several counterclockwise revolutions of the drive pulley. During counterclockwise movement of lever 85, however, the drive shaft remains stationary as a result of the unidirectional coupling provided between countershaft 86 and gear 91 by pawl 94 and ratchet wheel 93.

Cam member 98 is rotatably supported on drive shaft 95 between pinion 96 and frame plate 11, with its hub member 99 received in opening 49 of cam follower member 51 in the same manner previously described. Instead of being coupled frictionally to the drive shaft, however, this cam member is provided with an integral pinion 101 constantly meshed with cam drive gear 89 on countershaft 86. The latter gear is about three times as large as pinion 101, whereby reciprocative movement of lever 85 through the substantially right angle defined by pins 87 and 88 causes corresponding counterrotational movement of the cam member through a predetermined angle of about 270°.

Although of somewhat different profiles than cam lobes 47 and 48, the corresponding lobes 102 and 103 of cam member 98 likewise are engaged respectively with cam follower arm 67 and cam follower member 51, to establish different positions of the drive belt member and the stripper finger in accordance with the rotational position of the cam member. It should be noted, however, that cam lobe 103 is devoid of means corresponding to abutment surfaces 78 and 79 for limiting the maximum angular rotation of the cam member inasmuch as that function is provided by pins 87 and 88.

When lever 85 is in its vertical position against pin 87, depicted in solid lines in FIGS. 4 and 6, cam lobes 102 and 103 are oriented as shown in the latter FIG. and thereby retain the belt drive member and the stripper finger in their respective inoperative locations beyond film cartridge 17 in the same manner previously described in connection with FIGS. 1—3. As the operator moves lever 85 manually in a clockwise direction to initiate the stripping and threading operation, the resulting counterclockwise movement of the cam member allows the stripper finger and the drive belt member to engage the film roll, in that sequence. By reference to FIG. 7, it will be apparent that cam member 98 rotates sufficiently to accomplish such movement of the drive belt member and the stripper finger in response to manual clockwise rotation of lever 85 through somewhat less than the first third of its maximum right-angle movement path. Accordingly, as lever 85 continues to be rotated in a clockwise direction between the positions shown in solid and broken lines in FIG. 7, the cam member rotates to the corresponding position shown in broken lines without further influence on the drive member or the stripper finger. Since the clockwise movement of the operating lever also produces counterclockwise rotation of drive pulley 26, it therefore will be apparent that such further movement of the lever between the two positions shown in FIG. 7 imparts unwinding rotation to the film roll and feeds the leading end of the film along channel 14. If a single 90° clockwise movement of lever 85 is sufficient to move the leading end of the film into engagement with the film pull down mechanism, the operator simply continues to reciprocate the lever between its extreme positions or, preferably, between the two positions shown in FIG. 7, until such engagement of the film with the pull down mechanism has been achieved. Thereupon, the lever is returned manually to its initial position, thus restoring the drive belt member and the stripper finger to their inoperative positions in which they in no way influence the ensuing operation of the projector.

The invention has been described in detail with particular reference to a preferred embodiment thereof, but it will be understood that variations and modifications can be effected within the spirit and scope of the invention.

I claim:

1. In a stripper mechanism adapted to cooperate with a rotatably supported roll of wound strip material to separate the leading end of said material from said roll and to conduct said leading end away from said roll, said mechanism including:
   a. a drive member having a peripherally movable roll engaging element;
   b. first support means for supporting said drive member for movement of said roll engaging element into and out of peripheral engagement with said roll;
   c. a stripper member; and
   d. second support means for supporting said stripper member for movement into and out of peripheral engagement with said roll;
   the improvement comprising:
   e. manually powered control means for moving said roll engaging element and said stripper member into and out of peripheral engagement with said roll; and
   f. manually powered drive means for imparting peripheral movement to said roll-engaging element so that said element will rotate said roll in an unwinding direction while in peripheral engagement therewith.

2. In a stripper mechanism adapted to cooperate with a rotatably supported roll of wound strip material to separate the leading end of said material from said roll and to conduct said leading end away from said roll, said mechanism including:
   a. drive means having a peripherally movable roll-engaging element;
   b. first support means for supporting said drive means for movement of said roll-engaging element into and out of peripheral engagement with said roll;
   c. a stripper member; and
   d. second support means for supporting said stripper member for movement into and out of peripheral engagement with said roll; the improvement comprising:
   e. operating means comprising an operating member movable manually in either of two directions, said operating means being coupled to said drive means and to said stripper member; and
   f. movement producing means adapted:
      1. to translate manual movement of said operating member in a predetermined one of said directions into roll unwinding peripheral movement of said roll engaging element and into movement of said element and said stripper member into peripheral engagement with said roll; and
      2. to translate manual movement of said operating member in the other one of said directions into movement of said roll engaging element and said stripper member out of peripheral engagement with said roll.

3. A film stripper mechanism according to claim 2 wherein said drive means comprises a plurality of pulleys, and said roll engaging element comprises an endless belt trained around said pulleys.

4. A film stripper mechanism according to claim 2 wherein:
   a. said drive means comprises:
      a plurality of rotatable pulleys mounted in fixed relation to one another; and
      2. said roll engaging member comprises an endless belt encircling said pulleys;
   b. said operating means comprises a rotatable drive shaft, said drive means being pivotally supported by said drive shaft for angular movement about the axis of said drive shaft, and one of said pulleys of said drive means being secured to said shaft whereby said belt is movable arcuately into and out of peripheral engagement with said roll and is driven by said one of said pulleys upon rotation of said drive shaft to produce peripheral movement of said belt; and
   c. said movement producing means comprises:
      1. a cam member rotatably supported along said shaft for bidirectional angular movement about the axis thereof between two predetermined positions;
      2. means frictionally connecting said cam member to said shaft so that rotation of the latter frictionally produces corresponding angular movement of said cam member; and
      3. means operatively connecting said cam member with said drive means and said stripper member to effect movement of said belt and said stripper member into peripheral engagement with said roll and to impart roll unwinding peripheral movement to said belt while said belt is so engaged with said roll in response to manual rotation of said shaft in said predetermined one of said directions and to effect movement of said belt and said stripper member out of peripheral engagement with said roll in response to manual rotation of said shaft in the opposite one of said directions.

5. In a stripper mechanism adapted to cooperate with a rotatably supported roll of wound strip material to separate the leading end of said material from said roll and to conduct said leading end away from said roll, said mechanism including:
   a. a drive member having a peripherally movable roll engaging element;
   b. first support means for supporting said drive member for movement of said roll engaging element into and out of peripheral engagement with said roll;
   c. a stripper member; and
   d. second support means for supporting said stripper member for movement into and out of peripheral engagement with said roll; the improvement comprising:
   e. a rotatably reciprocable operating member movable manually between a first position and a second position past a predetermined intermediate position;
   f. cam means for translating movement of said operating member from said first position to said second position into movement of said roll-engaging element and said stripper member into peripheral engagement with said roll, and for translating manual movement of said operating member from said intermediate position to said first position into movement of said roll-engaging element and said stripper member out of peripheral engagement of said roll, and
   g. drive means for translating movement of said operating member from said intermediate position toward said second position into roll-unwinding peripheral movement of said roll-engaging element while said element is in peripheral engagement with said roll.

6. A stripper mechanism according to claim 5 further comprising gear means positively connecting said operating member with said cam means to translate rotational movement of said operating member into simultaneous rotational movement of said cam means.

7. A stripper mechanism according to claim 5 further comprising drive means including a unidirectional clutch, said drive means being effective:
   a. to establish positive driving connection between said operating member and said roll-engaging element during manual movement of said operating member from said intermediate position toward said second position to thereby produce roll unwinding peripheral movement of said element while it is in peripheral engagement with said roll; and
   b. to disconnect said element from said operating member during movement of the latter from said second position toward said intermediate position.

8. A stripper mechanism according to claim 7 wherein said operating member comprises a manually operable lever movable arcuately about a pivot axis.